(12) United States Patent
Chen et al.

(10) Patent No.: US 7,584,327 B2
(45) Date of Patent: Sep. 1, 2009

(54) METHOD AND SYSTEM FOR PROXIMITY CACHING IN A MULTIPLE-CORE SYSTEM

(75) Inventors: Yen-Kuang Chen, Cupertino, CA (US); Christopher J. Hughes, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 11/320,788

(22) Filed: Dec. 30, 2005

(65) Prior Publication Data

US 2007/0156963 A1    Jul. 5, 2007

(51) Int. Cl.
G06F 12/00    (2006.01)

(52) U.S. Cl. .................. 711/130; 711/129; 711/121

(58) Field of Classification Search .............. None
See application file for complete search history.

(56) References Cited

U.S. PATENT DOCUMENTS

2002/0083299 A1*  6/2002  Van Huben et al. ........... 712/29
2004/0039880 A1*  2/2004  Pentkovski et al. ......... 711/146

OTHER PUBLICATIONS

Kim et al., "An Adaptive, Non-Uniform Cache Structure for Wire-Delay Dominated On-Chip Caches," SIGPLAN Notices Conference, ACM, vol. 37, No. 10, p. 211-222, (Oct. 2002).

Zhang et al., "Victim Replication: Maximizing Capacity while Hiding Wire Delay in Tiled Chip Multiprocessors," Proceedings $32^{nd}$ International Symposium on Computer Architecture, IEEE Comput. Soc., pp. 336-345 (2005).
Beckmann et al., "Managing Wire Delay in Large Chip-Multiprocessor Caches," Proceedings: $37^{th}$ International Symposium on Microarchitecture, IEEE Comput. Soc., pp. 319-330 (2004).
Ekanadham et al., "Prism" An Integrated Architecture for Scalable Shared Memory, Proceedings 1998 Fourth International Symposium on High-Perforamance Computer Architecture (Cat. No. 98TB100224), IEEE Comput. Soc., pp. 140-151 (1998).

* cited by examiner

Primary Examiner—Kevin L Ellis
Assistant Examiner—Thanh D Vo
(74) Attorney, Agent, or Firm—Kenyon & Kenyon LLP

(57) ABSTRACT

Embodiments of the invention relate to a method and system for caching data in a multiple-core system with shared cache. According to the embodiments, data used by the cores may be classified as being of one of predetermined types. The classification may enable efficiencies to be realized by performing different types of handling corresponding to different data types. For example, data classified as likely to be re-used may be stored in a shared cache, in a region of the shared cache that is closest to a core using the data. By storing the data this way, access time and energy consumption may be reduced if the data is subsequently retrieved for use by the core.

25 Claims, 4 Drawing Sheets

METHOD AND SYSTEM FOR PROXIMITY CACHING IN A MULTIPLE-CORE SYSTEM

BACKGROUND

In multi-core processors or processing systems, each core may correspond to a cache memory, accessible only by that core. Furthermore, shared cache memory, accessible to all of the cores, may be provided to extend cache capacity.

Cache access time may be affected by propagation delays caused by capacitance of interconnects from a logic circuit, such as a core, to or from the core. In general, cache access time may increase in proportion to such physical properties as the distance between the cache and an accessing logic, the width of the interconnect, etc. Accordingly, some prior art processors may organize a shared cache into multiple chunks and arrange the chunks so that frequently accessed data items are close to the processor(s) (or processing core(s)) that use them.

However, prior art caching schemes for moving frequently accessed items close to an accessing logic (e.g., processor core) may be expensive in terms of energy consumed and/or die area.

DETAILED DESCRIPTION

Embodiments of the invention relate to a technique for caching data in a multiple-core system with shared cache. According to some of the embodiments, data used by the cores may be classified as being of one of a number of types. In one embodiment, the classification may enable handling of the data to be done more efficiently, depending upon the data type. For example, in one embodiment, data classified as a first type may be stored in a shared cache, and in a region of the shared cache that is closest in proximity to a core using the data. By storing the first type of data closest to an accessing logic, such as a core, access time and energy consumption may be reduced if the data is subsequently retrieved for use by the core. Data classified as a second type may, by contrast, only be stored and processed in a core's private cache. By not storing the second type of data in shared cache, cache usage and energy consumption may be reduced.

In embodiments of the invention, data may be classified as being of one of three types: (a) data that is likely to be re-used and likely to be used by one core at a time, (b) data that is unlikely to be re-used and likely to be used by one core at a time, and (c) data that is likely to be used by more than one core at a time. A threshold of the frequency of predicted re-use could be established as a basis for classifying data as type (a) or type (b) data. This threshold could vary depending on applications. However, generally speaking, when type (a) data does not fit in private cache, substantial economies may be realized by moving the data to a region of the shared cache that is closest to a core using the data, because the type (a) data will likely be accessed multiple times by that core before it is accessed by another core and is moved away. Similarly, benefits may be realized by special handling of type (b) data. Data classified as type (b) may not be stored in the shared cache at all, but rather stored only in a private cache. Because type (b) data will likely never be accessed in the shared cache before being evicted, it may reduce energy consumption, and decrease the contention for the shared cache space, to never move type (b) data to shared cache.

Type (c) data may be treated as in a conventional memory system with a private cache per core and another level of cache shared among the cores.

Figure 1:
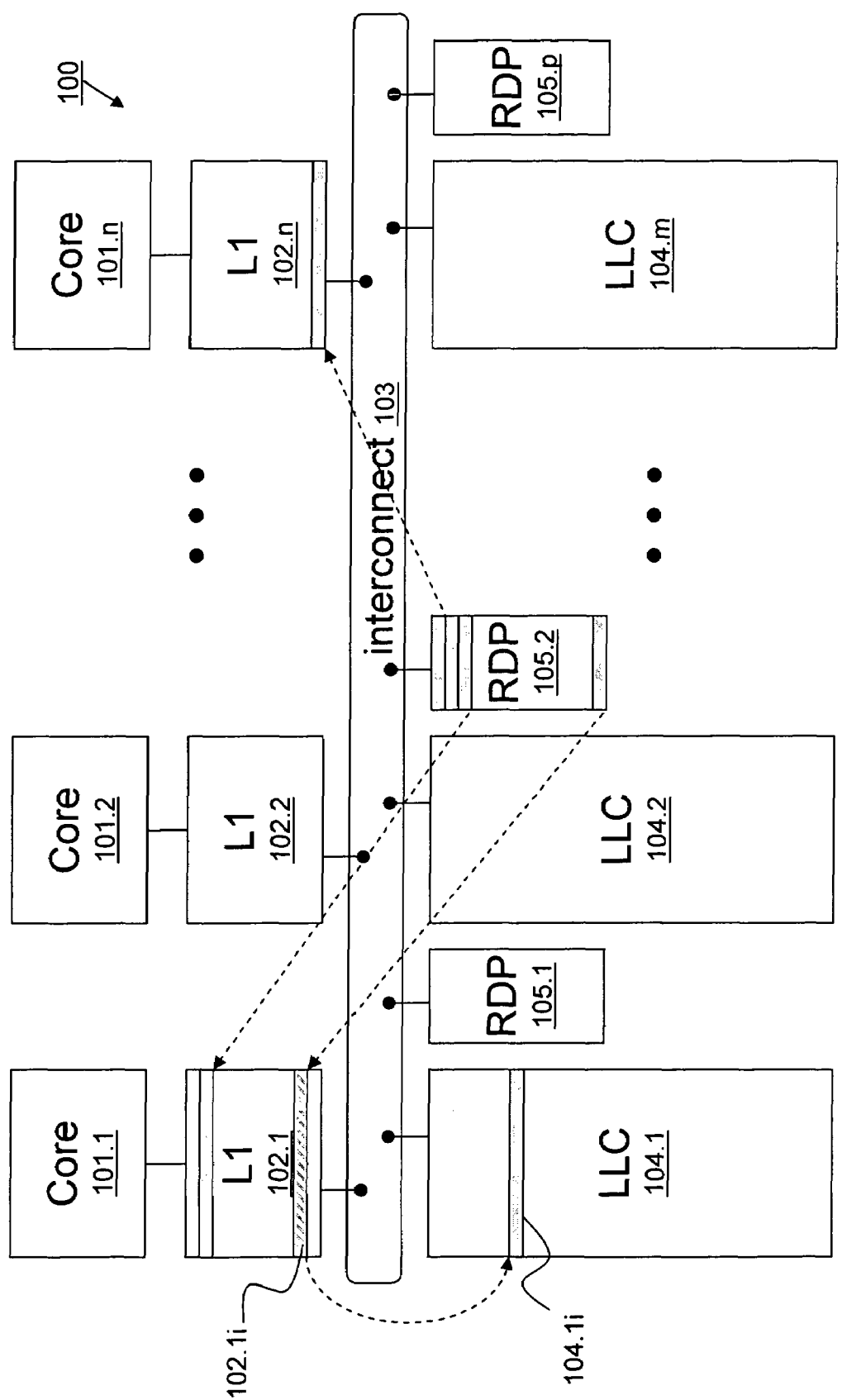
FIG. 1 shows a system architecture according to embodiments of the invention.

FIG. 1 shows a system 100 according to embodiments of the invention. The system may comprise a plurality of cores 101.1, 101.2, . . . , 101.n. Each core may have respective private L1 (level one) cache 102.1, 102.2, . . . , 102.n. Although only a single level of private cache is shown, in embodiments there could be multiple levels of private cache. The cores and their associated private cache may be coupled via interconnect 103 to shared cache (also, "last level cache" or LLC) banks 104.1, 104.2, . . . , 104.m (the correspondence of cores to shared cache banks is not necessarily one-to-one). The system may further comprise a plurality of roaming data pointers (RDPs) 105.1, 105.2, . . . , 105.p (the correspondence of the RDPs to the shared cache banks and cores is not necessarily one-to-one). The RDPs may point to cores. Collectively, the private and shared caches, and associated hardware may be known as a "cache subsystem."

Conventionally, as processing in a multiple-core system such as system 100 takes place, an address hashing function is performed to determine where to allocate cache lines in the shared cache 104.1, 104.2, . . . , 104.m, store data in them, and find that data. The address hashing function may be designed to distribute the data evenly among all banks. Type (a) data and type (b) data are considered "roaming data" since they are not necessarily in a location defined by this conventional address hashing function. The RDPs may point to cores that have handled roaming data, thereby enabling the roaming data to be located as described in more detail further on.

In the arrangement of FIG. 1, there is a closest bank in the shared cache to each core. According to embodiments of the invention, data may be classified as type (a) data, and based on the classification, stored in the private cache of the core that is using the data and/or a closest bank in the shared cache to that core. Conventionally, the data would instead be stored in a location in the shared cache determined by the conventional address hashing function described previously and possibly the core's private cache as well. By storing type (a) data in the closest bank, the data may be subsequently retrieved by that same core with reduced energy consumption and access time compared to the conventional scheme.

The classifying of the data as being of a predetermined type may, for example, be at least partly based on logic of a software program operating on the data, which has knowledge of the data based on a programmer's point of view. Such program logic may propagate type information to the cache subsystem. For example, the instructions in the program may contain bits indicating the classification of data they most often touch.

The initial classification provided by the software may be the basis for handling of the data following certain hardware operations on the data, which may reveal properties of the data or the processing environment which are not necessarily apparent to a programmer. These hardware operations may include, for example, evicting the data from private cache because private cache capacity or associativity is exceeded. Such operations are an indication that the data may be part of an important data set that does not fit in the private cache. Accordingly, if the data evicted from private cache is type (a), the evicted data may be stored in a closest bank of shared cache as described above. In FIG. 1, this process is illustrated.

Cache line 102.1*i* is being evicted from private cache 102.1 and placed in closest shared cache bank 104.1, as cache line 104.1*i*. If the data evicted is of type (b) and is dirty (i.e., has been written), the data may be sent back to external memory; otherwise, it may be discarded. In embodiments of the invention, coherence evictions may not trigger the above events.

Type (c) data may be treated as in a conventional memory system with a private cache per core and another level of cache shared amongst the cores. For example, one possible coherence protocol would operate as follows. On a private cache miss, the data will be brought into the requesting core's private cache and also into the shared cache bank corresponding to the shared cache's address hashing function. On a private cache eviction, if the data is dirty, it will be written back to the shared cache; otherwise, the data is discarded.

Events subsequent to the initial classification may indicate that re-classification of data is in order. Accordingly, embodiments of the invention further relate to re-classifying data, for example, from type (a) or (b) to type (c), or from type (c) to type (a) or (b).

The preceding has discussed aspects of how data may be classified and handled with respect to shared cache, based on its classification. The discussion now turns to how roaming (type (a) and (b)) data is tracked and located within the cache subsystem. According to embodiments of the invention, when a private cache miss occurs for roaming data, the data may be brought into the requesting core's private cache. The source of the data could be external memory or could be somewhere in the cache subsystem, depending on earlier events. When the data is brought into the requesting core's private cache, an entry may be allocated in an RDP for the roaming data. More specifically, the address of the roaming data may be used as input to an RDP address hashing function, whose output identifies a particular RDP in which to make the entry. That RDP entry may store the location of the requesting core. Consequently, the RDP entry indicates the core that last accessed the data, so that the data can be found in the event a different core requests the data. Additionally, when the data is brought into a private cache, it may further have an indicator, such as a flag written to a field of a cache line, storing its type. This information may facilitate identifying and possibly re-classifying data type in ongoing cache subsystem operations.

For type (b) data, the corresponding RDP entry may be invalidated after a private cache eviction, after being retained until the eviction in case a core needs to access this data while it is within the cache subsystem.

When a private cache miss occurs for a piece of roaming data, before fetching the data from external memory, the RDP corresponding to the RDP address hashing function may be consulted to determine whether the data is still within the cache subsystem. This operation may be performed because, although for roaming data it is likely that one core will use the data at a time, this is not guaranteed. A different core may need to access that same roaming data. Also, the last core to access the data may finish with it and no other core may access the data for some period of time. Either of the latter two conditions may mean that the needed data is still in the cache subsystem and that therefore retrieving the data from external memory is not necessary. If the data does have an RDP entry, the RDP entry will indicate the core that last accessed the data. If the data is roaming, the information in the RDP entry can be used to determine which core or shared cache bank may hold the data.

Figure 2:
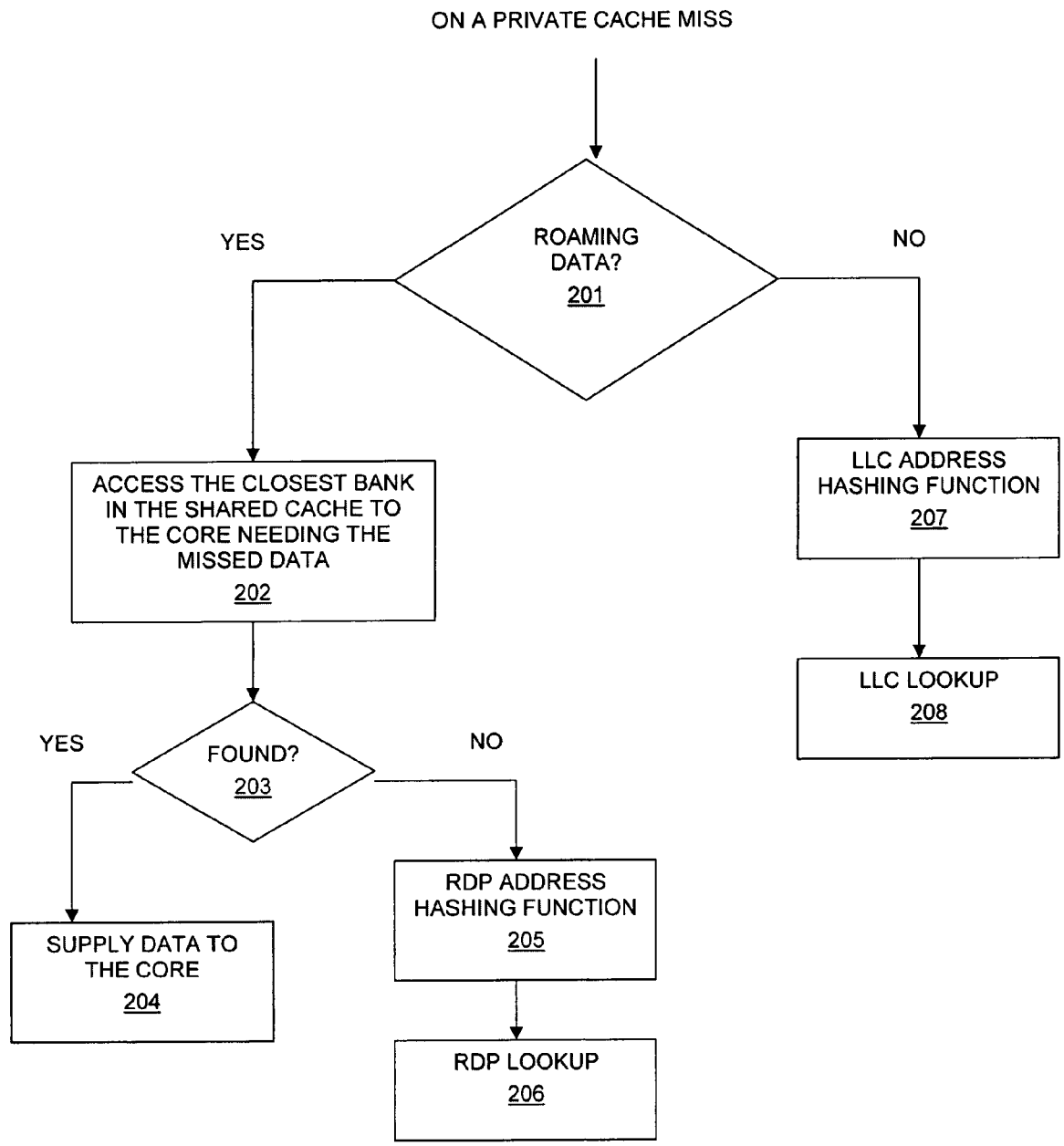
FIGS. 2 and 3 illustrate operations that may be used to perform at least one embodiment of the invention.

In view of the above discussion, FIG. 2 shows a data retrieval method according to embodiments of the invention. As shown in block 201, for a requesting core, on a miss in the private cache, it may be determined whether the missed data is roaming. In embodiments of the invention, a requesting instruction, such as a load, may specify the data's type, so that the determination as to whether the data is roaming can be made. Alternatively, hardware may predict or determine the data's type. In any event, if the data is roaming, the bank in the shared cache closest to the requesting core that missed in its private cache may be accessed, as shown in block 202. If the needed data is found there (block 203), it may be supplied to the requesting core, as shown in block 204. This outcome over time may yield significant savings in interconnect bandwidth, average memory latency, and energy consumption.

On the other hand, if the data is roaming but is not found in the closest bank to the requesting core, the data may have been accessed by a different core and consequently moved to that core's private cache or closest shared cache bank. Accordingly, the RDP corresponding to the data may be determined via the RDP address hashing function, as shown in block 205. That RDP may be searched for an entry for the data in question, as shown in block 206. If an entry is found, a message may be sent to the shared cache block and core corresponding to the RDP entry (the current possible locations of the data), and the RDP entry may be changed to point to the requesting core. The message may cause the data to be evicted from the private cache and/or the shared cache block (at least one of which currently stores the data) and sent to the core requesting it. The requesting core may place the data in its private cache.

As shown in blocks 207 and 208, if the data is not roaming, the missed data may be located by conventional methods. That is, the shared cache block corresponding to the shared cache address hashing function may be searched, and the action taken depends on the coherence protocol.

Figure 3:
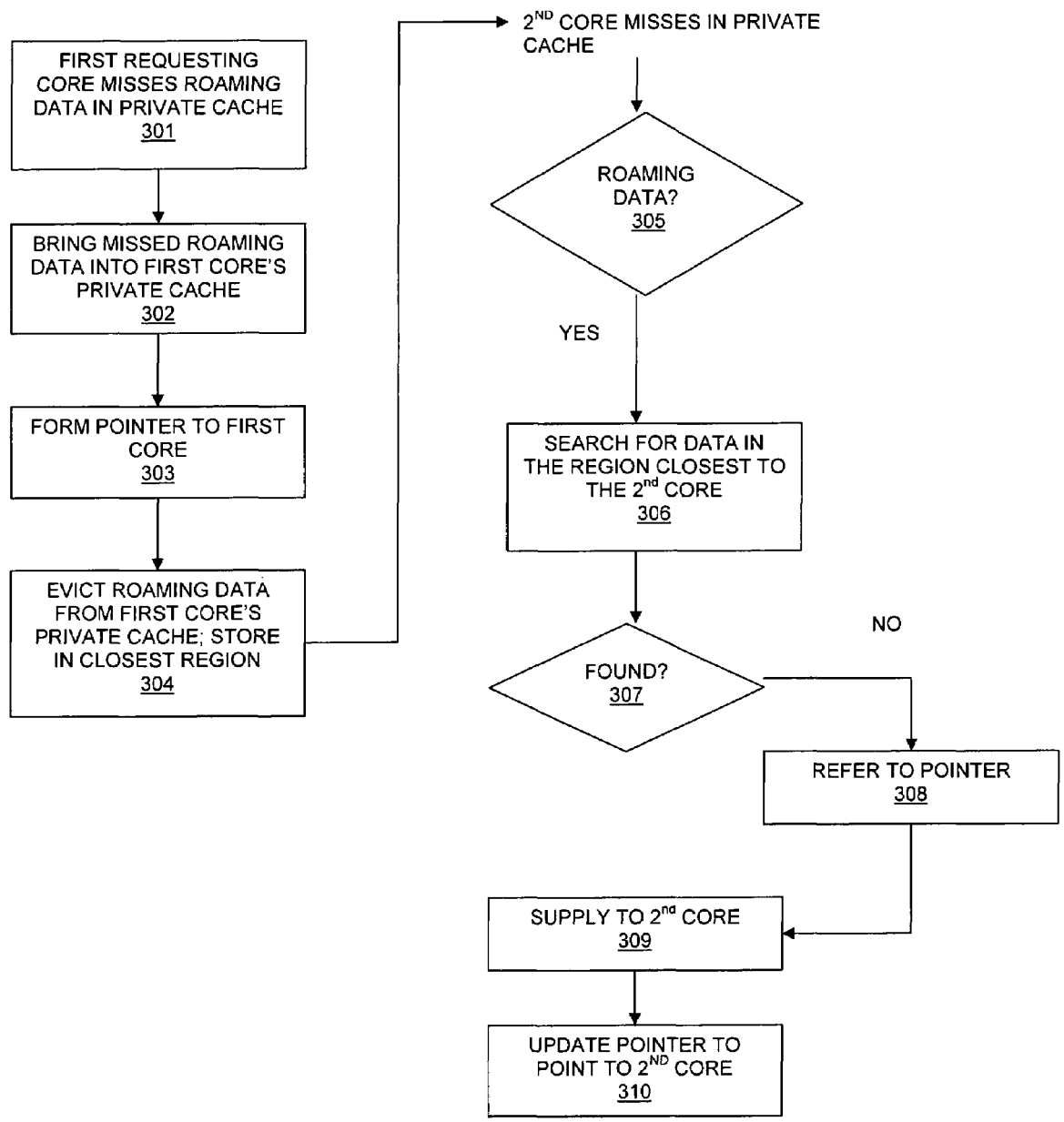

FIG. 3 shows another method according to embodiments of the invention. As shown in block 301, the method may comprise, for a first requesting core, missing roaming data in its private cache. The roaming data may then be brought into the first requesting core's private cache, from external memory or from somewhere in the cache subsystem, as shown in block 302. As shown in block 303, a pointer to the first requesting core may be formed, for example by creating an entry in an RDP.

As shown in block 304, the roaming data may subsequently be evicted from the first requesting core's private cache. The eviction may be, for example, a capacity or associativity eviction. If the evicted data is type (a) data, it may be stored in shared cache, in a region of the shared cache that is closest to the first requesting core. The data may subsequently be accessed multiple times in the shared cache by the first requesting core and thus may be in just the shared cache or both the private cache of the first requesting core and the shared cache.

It may subsequently happen that a second requesting core misses data in its private cache. The second requesting core may accordingly determine whether the missed data is roaming data, as shown in block 305. Assume the missed data is the roaming data last accessed by the first requesting core. Since the missed data is roaming data, the region of the shared cache that is closest to the second requesting core will be checked, as shown in block 306. Since the data is not there, the pointer (e.g., the RDP corresponding to the missed data) may be referenced, as shown in block 307-308.

The pointer will point to the first requesting core. Consequently, the data may be evicted from either or both of the private cache of the first requesting core or the shared cache bank corresponding to the first requesting core, and sent to the second requesting core, as shown in block 309. The pointer may be updated to point to the second requesting core, as shown in block 310.

As noted previously, embodiments of the invention may relate to re-classifying data based on events following initial classification. According to the embodiments, if, for example, no RDP entry is found for missed roaming data, the shared cache bank that the data would be stored in if the data were type (c) (i.e., the shared cache bank corresponding to the shared cache address hashing function) may be searched. If found via this search, the data may be re-classified as type (a) or (b) as appropriate, evicted from the shared cache block, sent to the requesting core, and copied into that core's private cache. In embodiments, the RDP lookup may be performed in parallel with the shared cache lookup. While possibly more expensive in terms of energy consumption and interconnect traffic, such a parallel search may find needed data faster than a serial search.

In another re-classifying operation, type (a) or (b) data may be re-classified as type (c) data. For example, it may happen that data was type (a) or type (b) with respect to certain instructions (e.g., a certain part of a program), but is type (c) with respect to other instructions (e.g., a different part of the program). Later instructions may therefore treat this data as non-roaming data. However, because the data was once roaming data, there may exist a corresponding RDP entry. Thus, according to embodiments of the invention, if non-roaming data is missed and the data is not found at the shared cache bank corresponding to the shared cache address hashing function, an RDP entry for the data in the RDP corresponding to the RDP address hashing function may be searched for. If an entry is found, a message may be sent to the shared cache block and core corresponding to the RDP entry (the current possible locations of the data). The message may cause the data to be changed to type (c), evicted from the private cache and/or the shared cache block (at least one of which currently stores the data) and sent to the shared cache bank corresponding to the shared cache address hashing function and the core requesting it. The requesting core may place the data in its private cache. The RDP entry may be invalidated. The foregoing operations allow data to change from type (a) or type (b) to type (c) and still be found.

Figure 4:
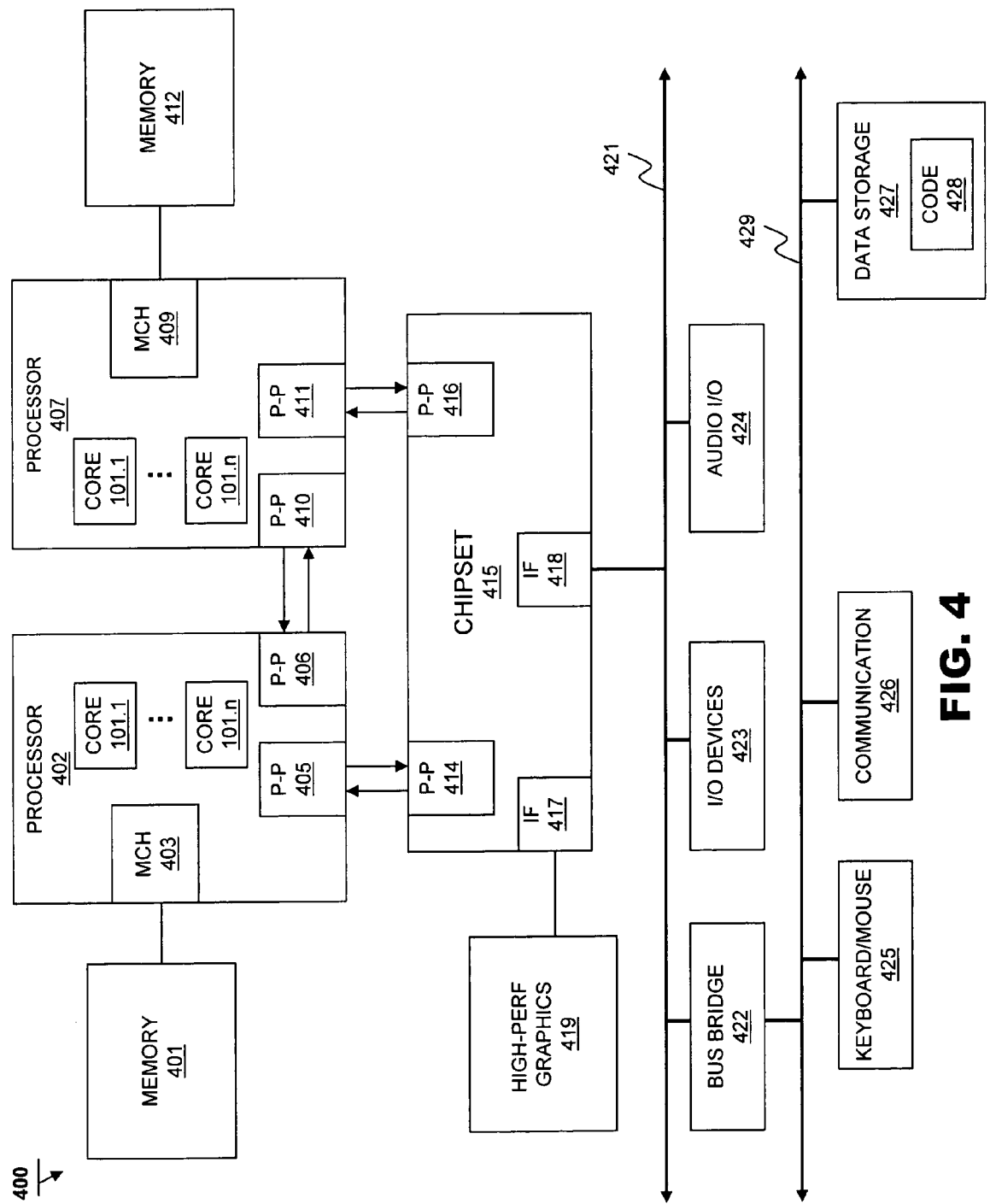
FIG. 4 shows a multi-processor system in which one or more embodiments of the invention may be used.

FIG. 4 is a block diagram of a computer system 400 including at least two processors (also, "processor chips" or "processor packages") 402, 407 and memory for use in accordance with an embodiment of the invention. Each processor 402, 407 may comprise a plurality of cores 101.1-101.n according to embodiments of the invention. Each core 101.1-101.n may be, for example, a processor core including ALU (arithmetic/logical unit) and FPU (floating point unit) execution units. The processors 402, 407 may be coupled to respective memories 401, 412 via respective local MCHs (memory controller hubs) 403, 409.

The processors 402, 407 may further be coupled to a chipset 415 via point-to-point (also, CSI or "Configurable System Interconnect") interfaces 405, 414 and 411, 416. The processors 402, 407 may further be coupled to each other via point-to-point interfaces 406, 410. The system 400 may further include high performance graphics logic 419, which may be coupled to the chipset 415 via an interface 417. The chipset 415 may be coupled via an interface 418 to additional system components, including a bus bridge 422, I/O devices 423, audio I/O logic 424, keyboard/mouse logic 425, communication logic 426 such as network interfaces, and data storage 427 (e.g., mass storage such as disk). The data storage 427 may store computer-executable code 428. System components may be interconnected by buses, such as buses 421, 429.

Each of the at least two processors 402, 407 may include logic to implement the invention. However, logic to implement the invention need not reside in the two processors. For example, the logic could reside elsewhere on a motherboard including the system 400.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method comprising:
   determining data as being a type that is likely to be used by one core at a time;
   based on the determination, storing the data in a region of a shared cache of a multiple-core system closest to a core using the data; and
   storing an entry in a data pointer pointing to the core, the entry being used to locate the data in the future based on the core being pointed to.

2. The method of claim 1, wherein the determination identifies data that is likely to be re-used.

3. The method of claim 1, further comprising:
   for data requested by a requesting core, determining whether the requested data is of the type that is likely to be used by one core at a time, and if so, searching for the data in a region of the shared cache that is closest to the requesting core.

4. The method of claim 3, further comprising:
   if the requested data is not found in the region of the shared cache that is closest to the requesting core, determining a respective entry in the data pointers pointing to a core previously accessing the data;
   sending a message to the core previously accessing the data;
   retrieving the requested data from one of a private cache of the core previously accessing the data, or a region of the shared cache closest to the core previously accessing the data; and
   updating the respective entry to point to the requesting core.

5. The method of claim 1, wherein the determination is based at least in part on software that operates on the data.

6. The method of claim 1, wherein the entry of the data pointer to store the core is determined by an address hashing function.

7. An article of manufacture tangibly embodying computer-executable instructions to perform a method, said method comprising:
   determining data as being a type that is to be used by one core at a time;
   based on the determination, storing the data in a region of a shared cache of a multiple-core system closest to a core using the data;
   storing an entry being used to locate the data in the future based on the core being pointed to.

8. The method of claim 7, further comprising:
   for data requested by a requesting core, determining whether the requested data is of the type that is likely to be used by one core at a time, and if so, searching for the requested data in a region of the shared cache that is closest to the requesting core.

9. The method of claim 8, further comprising:
   if the requested data is not found in the region of the shared cache that is closest to the requesting core, determining a respective entry in the data pointers pointing to a core previously accessing the data;

sending a message to the core previously accessing the data;

retrieving the requested data from one of a private cache of the core previously accessing the data, or a region of the shared cache closest to the core previously accessing the data; and updating the respective entry to point to the requesting core.

10. The method of claim 7, wherein the determination is based at least in part on software that operates on the data.

11. The method of claim 7, wherein the entry of the data pointer is determined by an address hashing function.

12. A processor comprising:
a plurality of cores;
a shared cache usable by two or more of the cores;
a plurality of data pointers, wherein each entry of the data pointers is to store an entry corresponding to a core; and
logic to store data upon a determination that the data is likely to be used by one core at a time, wherein the data is to be stored to a region of the shared cache closest to a first core using the data and a respective entry in the data pointers is to be stored to point to the first core using the data such that a second core requesting the data is to use the respective entry to locate the data.

13. The processor of claim 12, wherein the determination identifies data that is likely to be re-used.

14. The processor of claim 12, wherein the respective entry is determined by an address hashing function.

15. The processor of claim 12, the logic is to store the data in the shared cache closest to the first core after a private cache capacity eviction.

16. The processor of claim 12, the logic to further, after a miss of the data in a private cache of a requesting core, search for the data at a region of the shared cache closest to the requesting core.

17. The processor of claim 16, the logic to further, if the data is not found at the region of the shared cache closest to the requesting core, refer to the respective entry to determine which core last accessed the data.

18. The processor of claim 17, wherein the logic further to:
send a message to the core last accessed the data;
retrieving the data from one of a private cache of the core last accessed the data, or a region of the shared cache closest to the core last accessed the data; and
updating the respective entry to point to the requesting core.

19. A system comprising:
a memory;
a plurality of processors coupled to the memory, at least two of the processors including a plurality of cores;
a shared cache usable by each of the cores;
a plurality of data pointers; and
logic to store data upon a determination that the data is likely to be used by one core at a time, wherein the data is to be stored to a region of the shared cache closest to a first core using the data and a respective entry in the data pointers is to be stored to point to the first core using the data such that a second core requesting the data is to use the respective entry to locate the data.

20. The system of claim 19, wherein the determination identifies data that is likely to be re-used.

21. The system of claim 19, the logic to further, for data requested by a requesting core, determine whether the requested data is of the type likely to be used by one core at a time, and if so, search for the requested data in the region of the shared cache that is closest to the requesting core.

22. The system of claim 21, the logic to further, if the requested data is not found in the region of the shared cache that is closest to the requesting core and there is an entry in the data pointers for the requested data, retrieve the requested data from one of a private cache of a core previously accessing the data, or a region of the shared cache closest to the core previously accessing the data.

23. The system of claim 22, the logic to further, if the requested data is not found in the region of the shared cache that is closest to the requesting core and there is no entry in the data pointers for the requested data, bring the requested data into the private cache of the requesting core from the memory, and generate an entry in the data pointers pointing to the requesting core.

24. The system of claim 23, the logic to further evict the requested data from the private cache of the requesting core and store the data in the region of the shared cache that is closest to the requesting core.

25. The system of claim 19, wherein the respective entry is determined by an address hashing function.

* * * * *